R. ROSSBACH.
RIM FOR AUTOMOBILE WHEELS.
APPLICATION FILED APR. 11, 1921.
1,415,402.
Patented May 9, 1922.
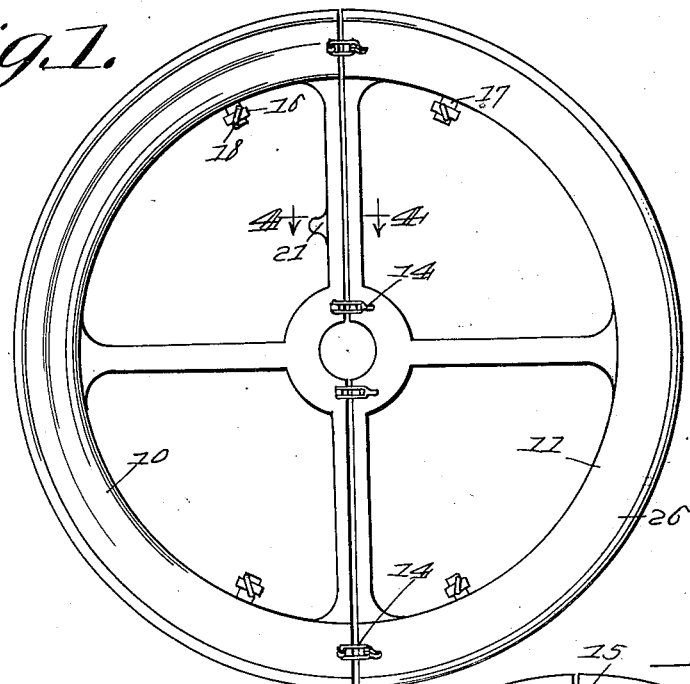
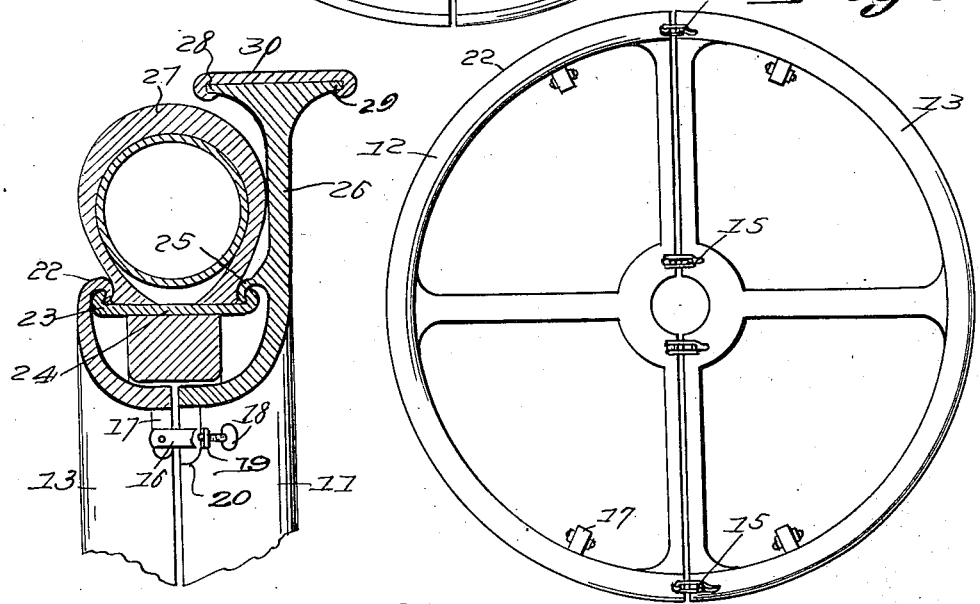
Inventor
Rose Rossbach.
By Francis Ackerman
Attorney

R. ROSSBACH.
RIM FOR AUTOMOBILE WHEELS.
APPLICATION FILED APR. 11, 1921.

1,415,402.

Patented May 9, 1922.
2 SHEETS—SHEET 2.

Inventor
Rose Rossbach.
By [signature]
Attorney

UNITED STATES PATENT OFFICE.

ROSE ROSSBACH, OF MISSOULA, MONTANA.

RIM FOR AUTOMOBILE WHEELS.

1,415,402.  Specification of Letters Patent.  Patented May 9, 1922.

Application filed April 11, 1921. Serial No. 460,256.

*To all whom it may concern:*

Be it known that I, ROSE ROSSBACH, a citizen of the United States of America, and resident of Missoula, in the county of Missoula and State of Montana, have invented certain new and useful Improvements in Rims for Automobile Wheels, of which the following is a specification.

This invention relates to vehicle wheels and particularly to those employed in connection with pneumatic tires, the said invention having for its object the provision of a novel emergency rim detachably connected to the ordinary rim of a vehicle tire and particularly to those which are employed in connection with pneumatic tires for automobiles.

A further object of this invention is to produce an auxiliary rim and tire in such relation to the pneumatic tire that it will support the load and prevent undue wearing of a tire which has become deflated; the said invention including novel means adapted to interlock with the flanges of a rim and having securing means whereby the device is firmly attached to the rim of such a tire.

A still further object of this invention is to provide a detachable auxiliary rim and tire associated with means for preventing creeping or shifting of the auxiliary member with regard to the tire or wheel to which it is applied.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of an auxiliary rim and tire embodying the invention;

Figure 2 illustrates a view in elevation of the opposite side thereof;

Figure 3 illustrates a transverse sectional view of a wheel rim showing the invention applied thereto;

Figure 4 illustrates a sectional view on the line 4—4 of Fig. 1;

Figure 5:
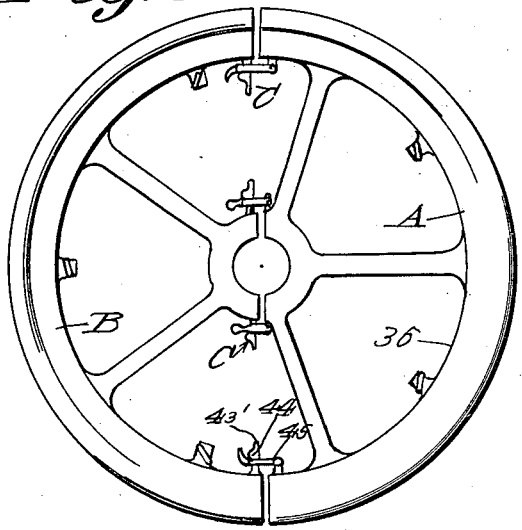
Figures 5 and 6 illustrate views in elevation embodying a modification.

In the present embodiment of the invention the complete auxiliary attachment comprises four sections 10, 11, 12 and 13, the sections 10 and 11 being connected together at one side of the wheel by fastenings 14—14 which are of identical structure, and the sections 12 and 13 being connected together, by similar fastenings identified by the reference character 15—15, on the opposite side of the wheel, and the said combined sections 10, 11, 12 and 13 being connected together by transversely extending coupling members such as 16 which are pivotally connected to lugs 17 extending inwardly from the section. The coupling members 16 are yoke-shaped devices having a binding screw 18 threaded through the end 19, the said yoke straddling a lug 20 on the opposite member and the screw bearing against the edge of the lug 20. The sections are provided with a plurality of such couplings, but a detailed description of one of them will suffice as an understanding of the remainder. One of the sections has a finger 21 which is adapted to bear against the side of a spoke to prevent movement of the device with relation to the wheel to which it is applied.

The sections 12 and 13 each has a flange 22 which is curved and is caused to interlock with the flange 23 of the rim 24. The sections 10 and 11 each has flanges 25 which interlock with the flange of the rim on the opposite side and each of the sections has a rim 26 extending outwardly substantially parallel with the side of the ordinary pneumatic tire casing 27 and provided with side flanges 28 and 29 to which a rubber tire 30 is secured by applying the tire longitudinally or circumferentially of the rim, it being understood that the tire will be sufficiently resilient to permit it to be slipped into place where it will be retained by the pressure exerted by the contraction of the material.

The clips or fastenings 14 comprise a link 31 pivotally connected to an eye 32 carried by one of the members and adapted to be forced over the latch 33 carried by the other member, the said latch having a recess or notch 34 in which the link is seated and retained in locked position.

Figure 6:
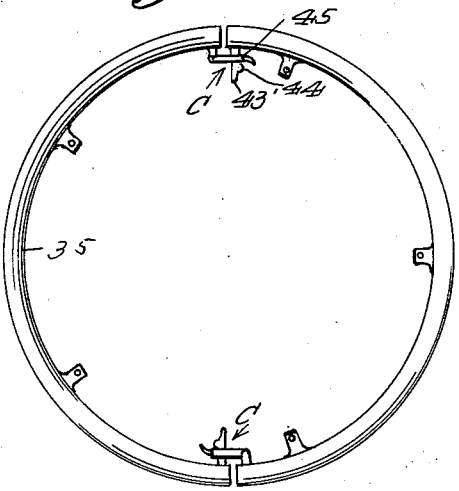
Figures 7, 8:
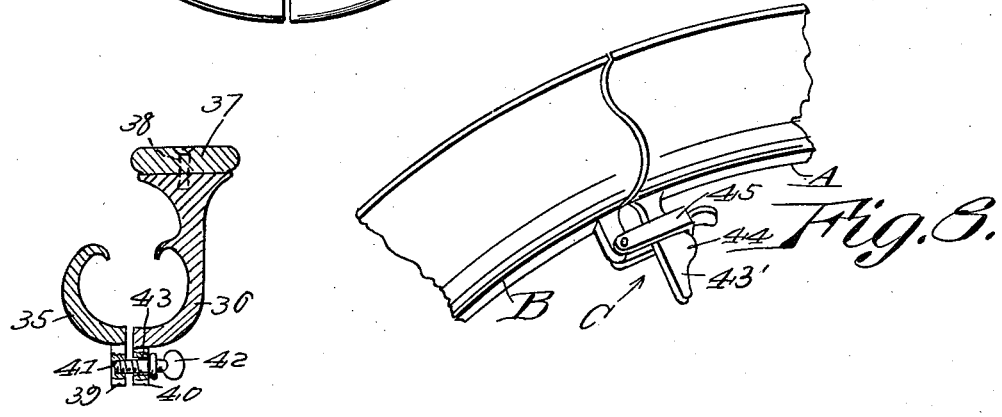
Figure 7 illustrates a transverse sectional view of the auxiliary rim and tire.
Figure 8 illustrates a perspective view of a fragment of the auxiliary rim.
Figure 9:
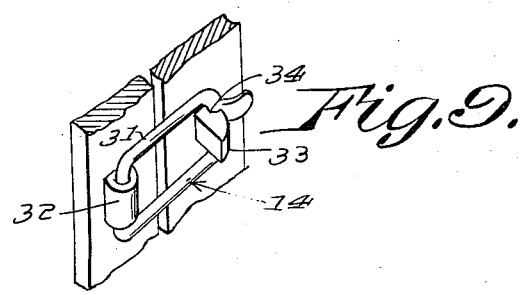
Figure 9 illustrates a perspective view of the latch or fastening.

In that form of the invention illustrated in Figures 5 to 8, the sections 35 and 36 are of the general contour and construction of like parts in Figures 1 and 2, but in this modified the tire 37 is secured to the periphery or outer surface of the rim by mechanical means such as screws 38, and the sections 35 and 36 have lugs 39 and 40 respectively, the former of which has a threaded aperture 41 to receive a screw 42 which is rotatable in an aperture 43 of the lug 40 so that the sections of the attachment are clamped together by the action of the screw. The sections 35 and 36 are semi-circular and coact with other sections of similar construction which form the whole supplemental rim. A rim section 35 and a rim section 36 are utilized to form the combined section A and a similar pair is employed to form the section B. The sections A and B which are approximately semi-circular are connected together after they are applied to a wheel by fastenings such as C, each of which comprises a post 43' with a shoulder or lug 44 thereon, engaged by a latch 45 pivotally connected to the section A and spanning the joint between the sections A and B. The sections A and B are thereby prevented from expanding or becoming disengaged from the rim of the wheel, but when in place constitute a tread surface or support for the vehicle, relieving the ordinary tires of wear while in a deflated state.

I claim:

1. In a supplemental rim for automobile wheels, curved sections on each side of the wheel, means for securing the said sections on each side of the wheel together, means for connecting the section on one side of the wheel to the sections on the other side thereof, means carried by the sections adapted to interlock with flanges of the wheel, and rim elements carried by the sections on one side of the wheel.

2. In a supplemental rim for automobile wheels, approximately semi-circular sections on each side of the wheel, means for securing the semi-circular sections on each side of the wheel together, means for connecting the sections on one side of the wheel to the sections on the other side thereof, means carried by the sections adapted to interlock with the flanges of the wheel, rim elements carried by the sections on one side of the wheel, and tires applied to the said rim sections.

3. In a supplemental rim for automobile wheels, approximately semi-circular sections on each side of the wheel, means for securing the semi-circular sections on one side of the wheel together, means for securing the semi-circular sections on the opposite side of the wheel together, lugs on the sections on one side of the wheel, yokes pivoted to said lugs on the sections on the opposite side of the wheel embraced by said yokes, screws threaded in the yokes bearing against the last mentioned lugs, means carried by the sections adapted to interlock with the flanges of the wheel, rim elements carried by the sections on one side of the wheel, and tires applied to said rim sections.

4. In a supplemental rim for automobile wheels, approximately semi-circular sections on each side of the wheel, latches for connecting the sections on one side of the wheel together, latches for connecting the sections on the other side of the wheel together, means for connecting the sections on one side of the wheel to the sections on the other side of the wheel, means carried by the sections adapted to interlock with the flanges of the wheel, rim elements carried by the sections on one side of the wheel, and tires applied to the said rim sections.

5. In a supplemental rim for automobiles, approximately semi-circular sections on each side of the wheel, latches for connecting the sections on one side of the wheel together, latches for connecting the sections on the other side of the wheel together, lugs on the sections on one side of the wheel, yokes pivoted to said lugs on the sections on the opposite side of the wheel embraced by said yokes, screws threaded in the yokes bearing against the last mentioned lugs, means carried by the sections adapted to interlock with the flanges of the wheel, rim elements carried by the sections on one side of the wheel, and tires applied to the said rim sections.

ROSE ROSSBACH.